(12) United States Patent
Witzel et al.

(10) Patent No.: US 8,743,868 B2
(45) Date of Patent: Jun. 3, 2014

(54) METHOD, DEVICES AND SYSTEM OF IMS SERVICES SESSION CONTROL VIA USSD

(75) Inventors: Andreas Witzel, Herzogenrath (DE); Ralf Keller, Würselen (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1968 days.

(21) Appl. No.: 11/935,455

(22) Filed: Nov. 6, 2007

(65) Prior Publication Data

US 2008/0117893 A1 May 22, 2008

Related U.S. Application Data

(60) Provisional application No. 60/864,493, filed on Nov. 6, 2006, provisional application No. 60/864,489, filed on Nov. 6, 2006.

(51) Int. Cl.
*H04B 7/00* (2006.01)
*H04W 4/00* (2009.01)
*H04M 11/00* (2006.01)

(52) U.S. Cl.
USPC ......... 370/352; 370/310; 455/466; 379/88.18

(58) Field of Classification Search
CPC ........ H04W 80/10; H04W 4/14; H04W 88/16
USPC ................ 370/352, 310; 455/466; 379/88.18
See application file for complete search history.

(56) References Cited

U.S. PATENT DOCUMENTS

| 2005/0107100 A1* | 5/2005 | Gustafsson et al. .......... 455/466 |
| 2007/0041367 A1* | 2/2007 | Mahdi ........................... 370/352 |
| 2007/0058788 A1* | 3/2007 | Mahdi et al. ................ 379/88.17 |
| 2008/0123625 A1* | 5/2008 | Buckley ....................... 370/352 |

OTHER PUBLICATIONS

3GPP SA WG2. 3$^{rd}$ Generation Partnership Profect; Technical Specification Group Services and System Aspects: Centralised IMS Service Control (Release 8) 3GPP TR 23.nnn v0.0.1. 3GPP Technical report. Oct. 17, 2006.

* cited by examiner

*Primary Examiner* — Asad Nawaz
*Assistant Examiner* — Stephanie Chang

(57) ABSTRACT

A system and method for allowing IMS subscribers to perform service and session control of IMS services via a CS access. A User Equipment, UE, that is registered with an IMS network but is not in a position to access the IMS network using IP can still access the IMS network and control the IMS sessions by sending Unstructured Supplementary Service Data, USSD, messages via an available Circuit Switched network that is connected to the IMS network.

16 Claims, 11 Drawing Sheets

METHOD, DEVICES AND SYSTEM OF IMS SERVICES SESSION CONTROL VIA USSD

CROSS-REFERENCE TO RELATED APPLICATIONS

This application claims the benefit of U.S. Provisional Application No. 60/864,493 filed Nov. 6, 2006, the disclosure of which is incorporated herein by reference. The present invention is related to the subject matter of the following commonly assigned, U.S. patent application Ser. No. 60/864, 489 entitled "IMS Centralized Services, USSD Architecture and Registration Control via USSD" filed Nov. 6, 2006. The content of this related application is incorporated herein by reference.

TECHNICAL FIELD

The present invention relates to IP Multimedia Subsystem, IMS, technology. More particularly, and not by way of limitation, the present invention is directed to a system, devices and method for accessing IMS services via a Circuit Switched access network.

BACKGROUND

Mobile networks are currently evolving from pure circuit switched, CS, networks towards Internet Protocol IP based networks, and by seamlessly integrating into IP based infrastructure that is also used for the internet, the World Wide Web and the datacom industry. With this trend mobile networks closely follow the evolution steps of the wireline networks, where Voice over Internet Protocol, VoIP, via Digital Subscriber Line, DSL, access or via Wireless Local Area Network, WLAN, access is existing technology today.

Mobile operators that install IMS, IP Multimedia Subsystem, networks and offer IMS services want to make these services available to Global System for Mobile Communications/Wideband Code Division Multiple Access, GSM/WCDMA, subscribers. Currently, calls from and to this group of GSM/WCDMA subscribers are to be routed through the IMS network in order to reach the IMS service engine.

If there is no full radio coverage capable of bidirectional speech Packet Switched access, that is, the UE is not able to connect to a Packet Switched access network and thus to the IMS, then the circuit switched access must be used. The concept is called IMS Centralized Services, ICS. This service is used to carry bi-directional speech media and to access the IMS. However, users cannot, control IMS services and sessions in a suitable way over a circuit switched access.

SUMMARY

It would be advantageous to have a system, devices and method for providing ICS and session control that overcomes unsuitable method of controlling the IMS services and sessions. The present invention provides such a system and method.

The present invention discloses a system and method for allowing IMS subscribers to perform session and service control of IMS services via a Circuit Switched, CS, access network. A User Equipment, UE, uses Unstructured Supplementary Service Data, USSD, via the CS network so as to associate the UE with an IMS adapter, IA. An IA identifier is provided to the UE and at least one USSD message is initiated via the CS access network to control a session or service in the IMS network.

The identifier is detected in the USSD message and is used to determine which IA instance is associated with the identifier. Then the USSD message is routed to the identified IA instance.

The IA instance then allocates a routing number to the IMS Centralized Service, CS, client in the UE. The routing number is returned to the ICS client is used for setting up a user plane from the UE to the IA.

In an embodiment of the invention, at a first registration of the subscriber/UE where the UE tries to first contact the IA, the IA informs an ICS client in the UE which USSD service code and IMS Adapter identifier to use for originating sessions and for control of ongoing sessions. This first registration can be done via USSD using CS access, or via SIP Registration using PS access. In order to access the network through CS access, the UE includes the IMS Adapter identifier in the message sent over USSD and uses the USSD service code that was provided at the initial registration of the subscriber. The IA identifier determines the particular IA node and the instance linking that IA node and the ICS client in the UE.

In another aspect, a USSD application coupled to the IA node, checks the USSD request for an IA identifier and USSD service code. The USSD application may be incorporated in HLR or in MSC nodes. It may also be outside the HLR or MSC nodes, but then the USSD application in the HLR or MSC must relay the USSD messages to this external node. If an IA identifier and USSD service code, used for identifying the correct USSD application in the HLR or MSC, is detected in the USSD request, the USSD application uses the IA identifier to find the correct IA node. If the MSC connecting the UE to the CS network does not have a USSD handler for the service code, then the USSD dialogue is directed through the HLR. The IA upon receipt of the USSD request replies with a Routing Number for use by the ICS client in the UE. The Routing number can be provided either as a response to the first registration or when the originating session invitation is received.

In still another aspect, the present invention is directed to a system for control of IP Multimedia Subsystem, IMS, sessions and services. The system involves a serving Mobile Switching Center coupled with a Home Location Register where either or both the MSC and the HLR are equipped with an Unstructured Supplementary Service Data handler.

The invention is furthermore directed to a User Equipment that is capable of accessing and associating with an IMS adapter via a Circuit Switched access network USSD. The UE includes an IMS client and an ICS client. The ICS client communicates with the IMS client to, among other things, receive IMS session requests from the IMS client. The UE initiates a session with an IMS Adapter in an accessible Circuit Switched network, using Unstructured Supplementary Service Data messaging. The USSD messages are sent to a USSD application in the circuit switched network, typically in a switching node, to establish a user plane between the UE and the IMS adapter. The IMS adapter is the connection between the UE and the IMS.

The UE receives USSD messages from the IA node via the switching node, e.g. an MSC or an MSC-S. The messages include a routing number allocated to the UE for routing an originating session request from the UE to an IA instance. The routing number is based on a USSD service code for identifying a particular IA instance in the IA node. The UE includes means for controlling a Media Proxy for handling the user plane, handling the media with regard to hold/retrieve service and session waiting and means for mapping the USSD requests to the appropriate SIP messages.

The above systems and devices can be adapted to any embodiments of the method.

BRIEF DESCRIPTION OF THE DRAWINGS

In the following section, the invention will be described with reference to exemplary embodiments illustrated in the figures, in which.

DETAILED DESCRIPTION OF THE INVENTION

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other The novel features that are considered characteristic of this invention are set forth with particularity in the appended claims. The invention itself, however, both as to its organization and method of operation, as well as additional objects and advantages thereof, will best be understood from the following description when read in connection with the accompanying drawing.

For $3^{rd}$ Generation telecommunication networks, Unstructured Supplementary Service Data, USSD, is defined in 3GPP specifications 22.090, 23.090. The specifications define two modes of USSD: MMI-mode and application mode. The application mode of USSD allows a transparent transport of data between the network and the terminal so that it can be used by applications in the network and their peer applications in the terminal. USSD application mode can also be used for the present invention.

Figure 1:
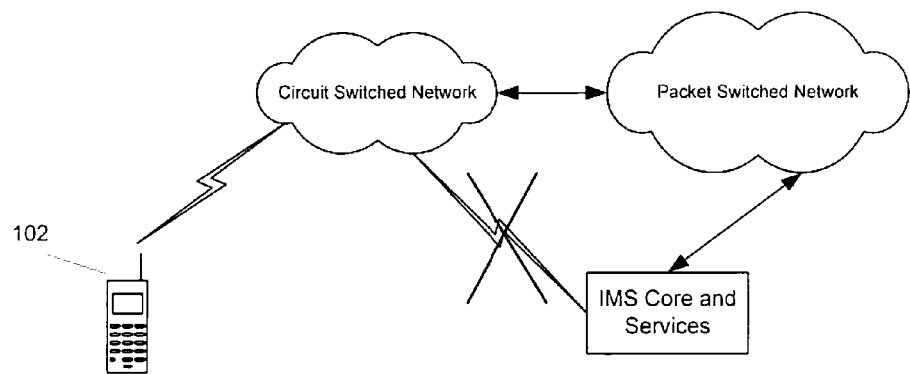
FIG. 1 depicts a high level block diagram of an ICS system in accordance with a preferred embodiment of the present invention.

FIG. 1 is a high level block diagram of a circuit switched network and a packet switched network connected to an IMS subsystem. As indicated, in the prior art a wireless user equipment that is unable to connect to a Packet Switched network does not have access to the IMS core and services. The circuit switched network does not have any access to the IMS Core and Services.

An IMS Network can include an IMS core and IMS related application servers. The IMS core comprises core nodes of the IMS network, for example P-CSCF, I-CSCF, S-CSCF, and HSS. The IMS core is typically involved in basic aspects of the session control such as session setup and release. Mid-session services may also involve IMS application servers in other parts of the IMS network.

Figure 2:
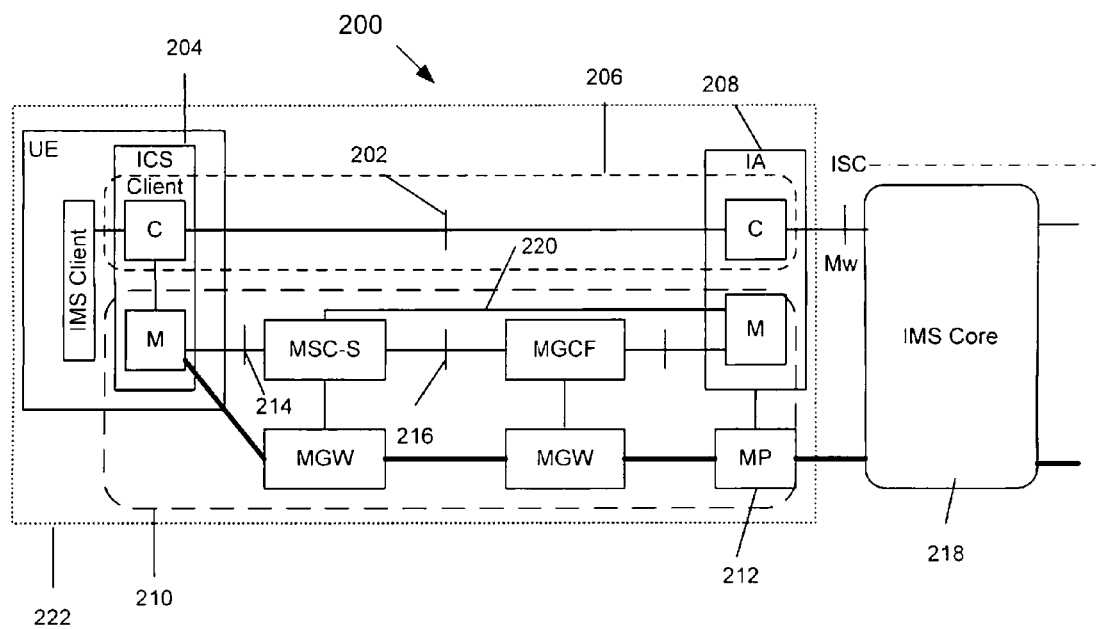
FIG. 2 depicts a high level block diagram of an ICS system in accordance with a preferred embodiment of the present invention.

FIG. 2 depicts a high level block diagram of an ICS system in accordance with a preferred embodiment of the present invention. ICS system 200 emulates a 'standard' IMS terminal plus P-CSCF towards IMS core 218. Control protocol 202 is provided for session (e.g., a call) setup, mid-session procedures, IMS registration, etc., between IMS core 218 and C, the control functionality in the ICS client 204, i.e. for any desired Session Control. The combination of ICS client 204, signaling using control protocol 202 and IMS Adapter, IA, 208 are all considered Session Control handling functions, where IA 208, among other functions, performs IMS registration on behalf of UE 201 when IA 208 determines an IMS registration need, e.g., timeout or a request of the IMS client. Control Protocol 202 can be USSD based or may also be partly realized via SIP messages over PS access (not described further). So one preferred embodiment is to use SIP Register via PS access for the initial registration into IMS, while for session control and mid-session services USSD via CS access may be utilized. The following description refers to the case that USSD through CS access is used.

IA 208 seizes an internal instance for handling UE 201 during the lifetime of the IMS registration. IA 208 performs IMS registration on behalf of ICS client 204. In a USSD return message, IA 208 includes the IA identity and a USSD Service Code that is stored in ICS client 204. Subsequent requests from ICS client 204 include the IA identity and the USSD service code in order to find the correct IA node and instance.

A Media function, M, is also provided in ICS client 204 and is part of Media Connection handling 210, which handles the media connection from UE 201 to a media transport address. Media Proxy 212 provides the media transport address for UE 201 and performs toggling of outbound flows, muting, etc. for multiparty sessions; conference bridging is handled by IMS core 218. Signaling takes place between the Media functionality in ICS client 204 and a switching node, MSC-S, using DTAP signaling according to 3GPP 24.008. Signaling between the MSC-S and MGCF utilizes call control protocol 216, e.g., ISUP for voice media connection setup and SIP between the MGCF and Media functionality in IA 208.

The switching node, in particular a mobile switching center (MSC), can be a monolithic node handling both control signaling and the user plane like an MSC. Alternatively the switching node can be implemented as a server, e.g. an MSC server (MSC-S), which handles the control signaling while the user plane is handled in a Media Gateway according to control messages from the MSC server. In the present description generally either monolithic nodes or servers can be used in place of each other unless expressly indicated. The same applies for the GMSC, which may be implemented as a GMSC Server or as a monolithic node such as GMSC.

ICS client 204 in UE 201 includes the following functions: 1) receives an IMS Session request from the IMS client in the UE; 2) uses the ICS protocol over USSD (or a PS access if appropriate) for communication to the IA; 3) creates USSD messages according to the requests of the IMS client and preferably forwards information extracted from received USSD messages to the IMS client; and 4) establishes a media connection via the CS access.

The functions in the IA Node include: 1) allocates a routing number, e.g. an IMS routing number IMRN, to route originating sessions from the switching node, in this example the MSC-S to the IA; 2) controls a Media Proxy for user plane handling; 3) handling of media in case of hold or retrieve service, session waiting; and 4) map the USSD messages to appropriate SIP messages; and 5, stores the serving MSC-S address.

The USSD Application in MSC-S includes the following functions: 1) route the USSD based on the received IA identity and USSD Service Code and 2) allocates a routing number, e.g. a Mobile Station Roaming Number MSRN, to route terminating session to the MSC-S.

When the UE initiates an IMS session via a CS access, the UE uses, e.g., USSD to indicate this to the IA. The IA identity and USSD Service Code have been received from the allocated IA at Registration. Initial IMS registration of UE 201 takes place utilizing ICS system 200 and a designated IA instance is allocated and associated with ICS client 204 in UE 201. The same IA instance is associated with ICS client 204 as long as the IMS registration is active. If there is no USSD application available in MSC-S the specified handling in the MSC-S is to forward all USSD requests from the UE to the UE's HLR. This allows UE 201 to roam in the home network or any visited network.

Note that the IA identity identifies not only the IA node as such, but also sends an indication of the IA instance handling registration of the user within that IA node. The instance contains subscriber related data such as the public user identity, IMSI, MSISDN.

When requesting an originating session, ICS client 204 in UE 201 includes the stored IA identity and the USSD service code in a USSD originating session request. The ICS client uses the USSD Service Code received from the IA at IMS Registration.

Figure 3:
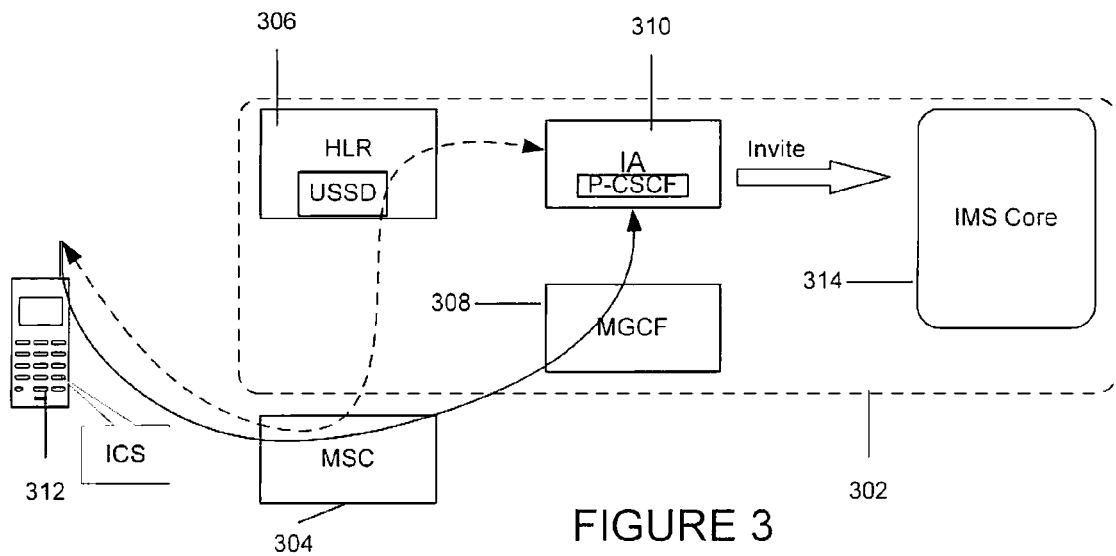
FIG. 3 illustrates a USSD controlled originating Session Handling via CS Access according to an embodiment of the present invention.

FIG. 3 illustrates a USSD controlled originating Session Handling via CS Access according to an embodiment of the present invention. In the embodiment the HLR hosts an ICS USSD Application. A USSD message is initiated in the ICS client in UE 212 and sent to MSC 304. As shown, MSC 304 does not recognize this USSD Service Code as there is no appropriate USSD application available. So, MSC 304 forwards this USSD message to the HLR 206. HLR 306 hosts a specific ICS USSD application; this USSD application is specific to originating session requests and is identified in HLR 306 by the USSD Service Code. Signal path 303 illustrates the route taken by the USSD message.

HLR 306 USSD application analyzes the information included in the USSD message and extracts the IA identity, which is used to forward the USSD message to the appropriate IA node 310 and IA instance. IA node 310 then allocates a Routing Number, e.g. an IMRN, and returns that number to ICS client 304. The routing number is used by ICS client 304 for setting up a user plane connection 301 via a MGCF 308 to the IA 310.

Figure 4:
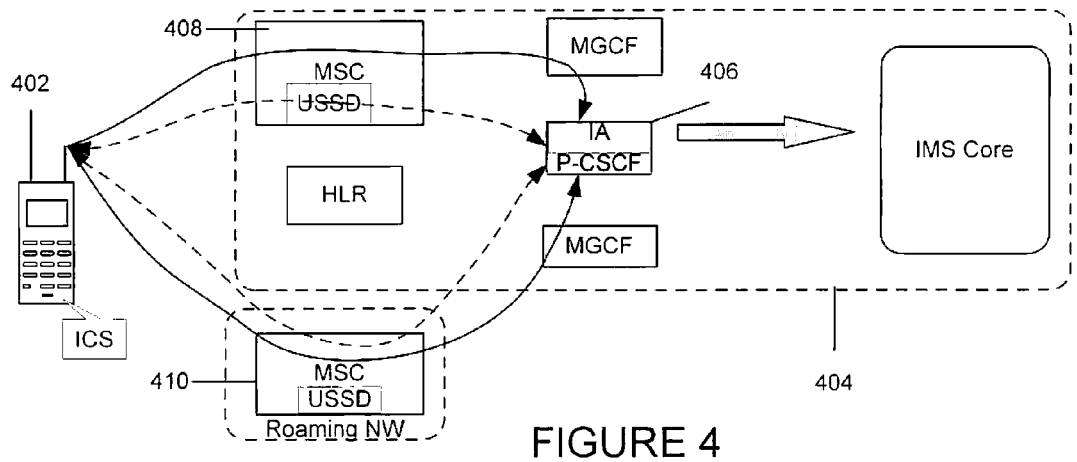
FIG. 4 depicts a USSD controlled originating Session Handling via CS Access, with an MSC based ICS USSD application in accordance with an embodiment of the present invention.
Figure 4A:
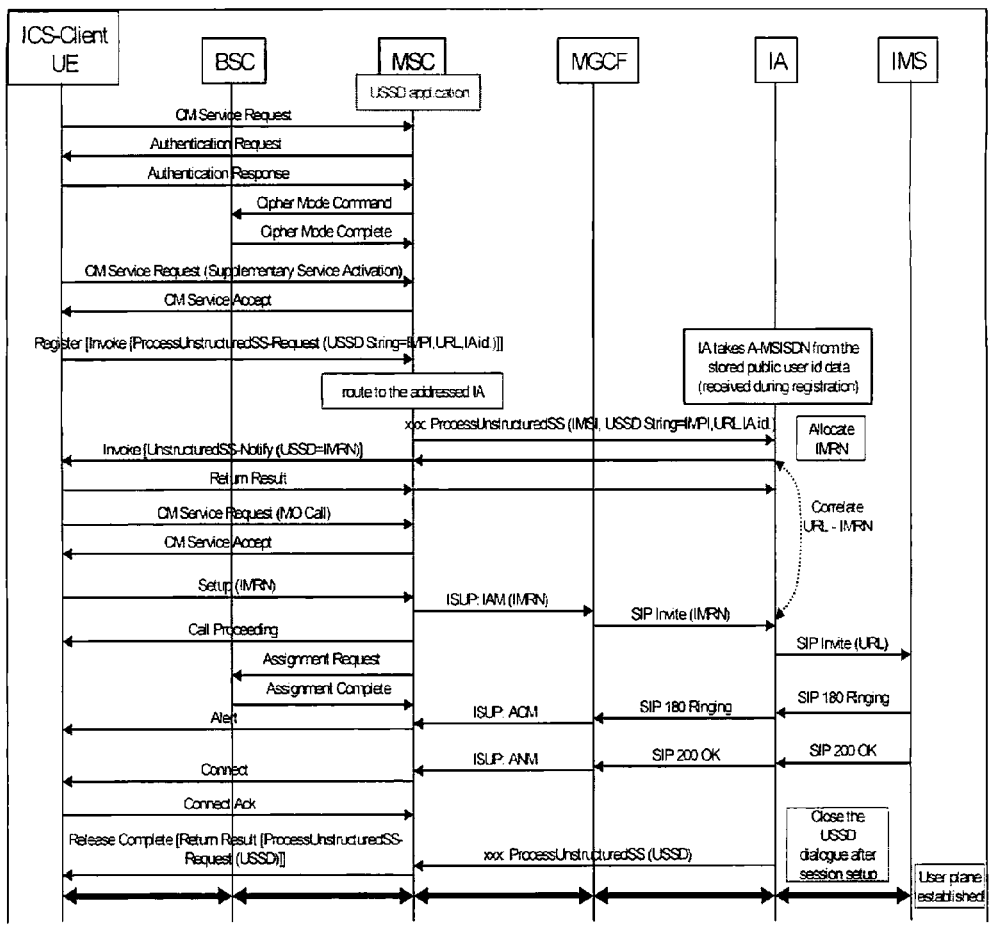
FIG. 4a depicts a signal flow diagram of a USSD controlled originating Session setup according to a preferred embodiment of the present invention.

FIGS. 4 and 4a depict USSD controlled originating Session Handling via CS Access, with an MSC based ICS USSD application in accordance with an embodiment of the present invention. Normally the serving MSC hosting this ICS USSD application is located in the home network 404. When the serving MSC hosting this ICS USSD application is located in a roaming network 410, co-operation between the home operator and the visited operator is required to enable the presence of such USSD application. Correspondingly, two scenarios for a session are illustrated: a home network scenario in which the UE 402 is located in the home network and a roaming network scenario in which the session is handled via a serving MSC in a visited network.

At IMS Registration, the IA 406 tells the ICS client in UE 402 which USSD Service Code to use for originating sessions. So IA 406 has full control over whether to allow using local USSD applications in the MSC or MSC-S where UE 402 is currently roaming.

The USSD message is received in MSC 408 (home network scenario) or MSC 410 (roaming network scenario) and the local USSD application on the MSC analyzes the USSD message and extracts the IA identity. The handling in the USSD application is the same as for the USSD application in the HLR described above. The IA 406 allocates a routing number and the user plane is routed with this routing number to the IA via either MSC 408 or MSC 410 and the respective MGCF prior to connecting with IMS core 414.

FIG. 4a depicts a signal flow diagram of a USSD controlled originating Session setup according to a preferred embodiment of the present invention. The ICS client in the UE initiates registration of the UE by sending a USSD message to the MSC. The MSC then routes the USSD message to the IA addressed in this registration USSD message. The IA determines the ICS client, e.g. from the IMPI (IP Multimedia Private Identity) or the IA identification in the USSD message and takes the MSISDN from the stored public user id data, e.g. received during registration. A routing number is allocated to the ICS client and returned through the MSC to the ICS client in the UE. The IA stores a correlation between the allocated routing number and the registered ICS client. The registered ICS client is represented in the IMS network by a SIP URL.

The ICS client then initiates session setup utilizing the received routing number in a setup message through the MSC-S which sends a call control message, e.g. an ISUP message, containing the received routing number to the MGCF. The MGCF then converts the call control message to a SIP Invite message, also including the routing number and forwards the SIP Invite message to the IA. Using the stored correlation the IA translates the received routing number to the URL of the subscriber in the IMS network and sends the SIP Invite message to the IMS network. The IMS network responds in the normal manner. Upon receipt of the response from the IMS network, the ICS client establishes a user plane between the UE and the IMS network and the USSD dialog is closed.

FIG. 5 depicts high level flow diagrams of methods of accessing and controlling IMS sessions via a circuit switched network, according to embodiments of the present invention. The process begins with a UE attempting to access IMS services in a network, 502. A determination is made whether there a packet switched access network is available and capable, 504, and if so, the connection is made directly to the IMS services via this packet switched access network, 506. However, if there is no PS access network available or not capable, an ICS client in the UE generates a USSD message to contact to an IMS adapter for connection to the IMS core, 508.

There are a number of reasons that the UE may not connect directly to the IMS core via a PS access network for IMS services. For instance a trigger for connecting to IMS through the CS access network may e.g. be: no PS network; the Radio Access Network is not capable; speech quality on the available PS network is poor, the subscriber directs the CS access action, PS network overloaded, etc.

The USSD message generated in step 508 is received by either an MSC and processed by a USSD application in the MSC or forwarded to the HLR, which typically has a USSD application, for processing, 510. A decision can be taken to handle the USSD message locally in the MSC or centrally in the HLR based on the USSD Service Code. This USSD Service Code is stored in the ICS client in the UE and was received from the IA at IMS Registration. The USSD request is checked for an IMS Adapter Identifier, 512, and the message is forwarded to the addressed IA, 514, and the associated IA instance. The IA instance allocates, 516, an IMRN as an example for a routing number and returns that routing number to the UE, 518, which then proceeds to connect to the IMS network through the CS network, 520. After the connection, the UE and the IMS network start an ongoing session, 521.

Figure 5A:
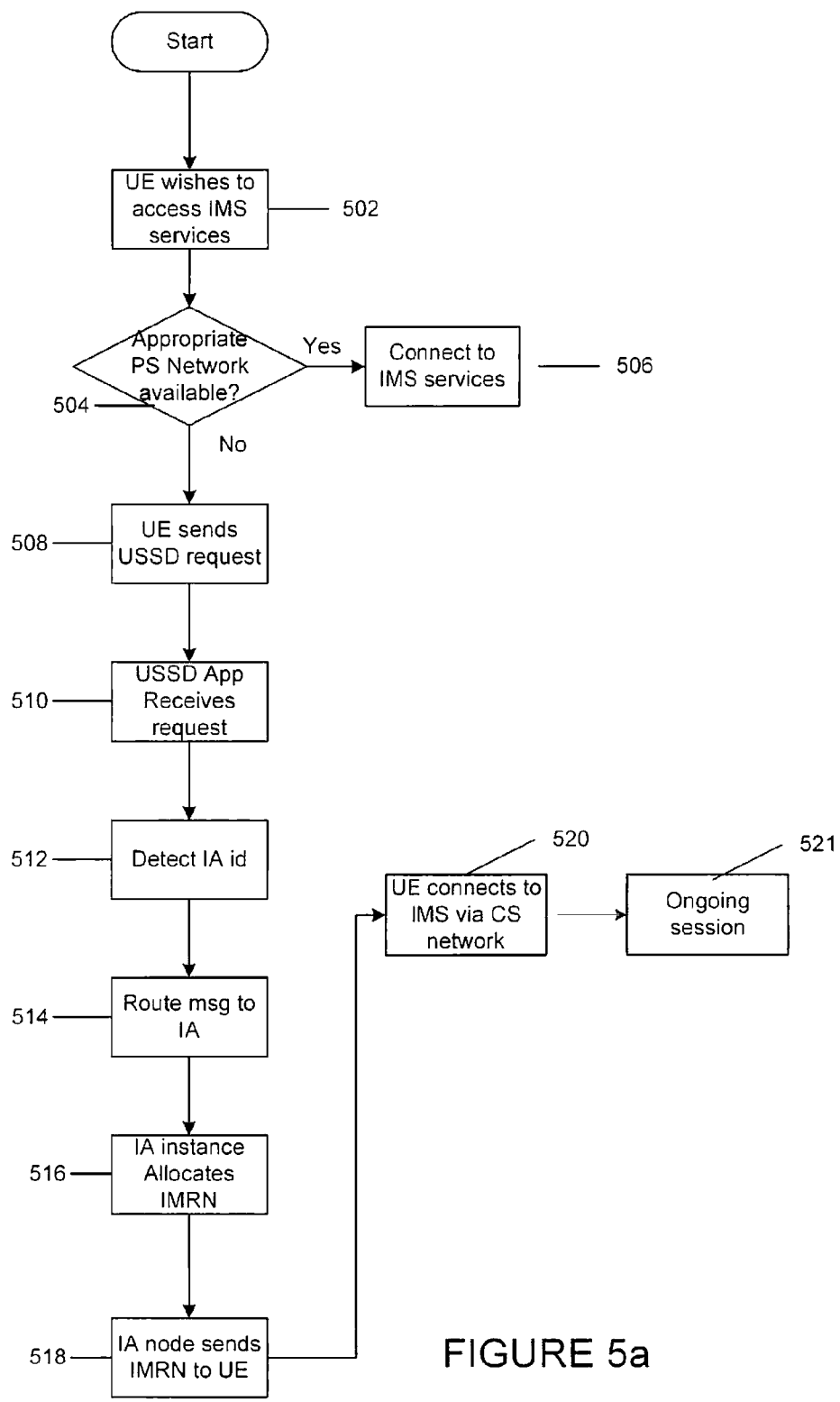
FIGS. 5a, 5b, 5c, and 5d depict high level flow diagrams of a method of accessing and controlling IMS sessions via a circuit switched network, according to an embodiment of the present invention.
Figure 5B:
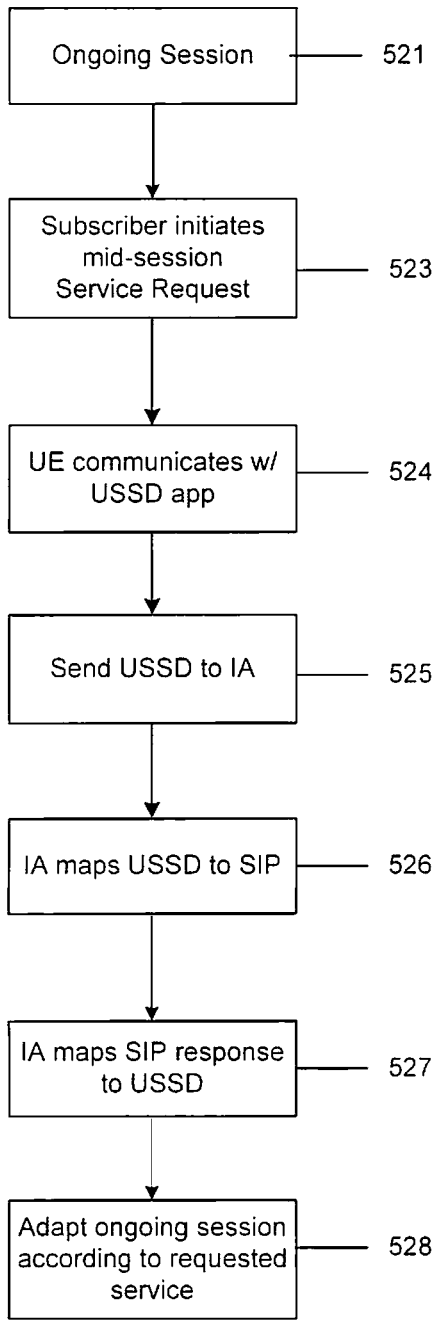

Referring now to FIG. 5b, after the session establishment as described above, during the ongoing session, 521 there may be a mid-session service request, a terminating session request, or an originating session request (not illustrated here), in parallel to the ongoing session. If there are no requests, the process continues to check for the presence of requests. A mid-session service message may be generated by the UE or the IMS network. If a mid-session request is triggered in the UE, the UE sends a USSD message 524, with the IA identity included, and the IA maps the USSD message to a corresponding SIP message, 526. The SIP message is sent to the IMS network. When receiving a SIP response from the IMS network, the IA translates the response to an appropriate response USSD message, 527. If the mid-call request is generated by the IMS network, a SIP mid-session request is sent to the IA. The IA translates the SIP mid-session request to an appropriate USSD message and forwards that to the USSD application. This causes the USSD application in the MSC, or HLR, to send a USSD message to the ICS client in the UE.

After receipt of the USSD response, the ongoing session is adapted according to the mid-session message, 528, e.g. the ongoing session is put on hold, or the subscriber is notified of being put on hold by the remote subscriber.

Figure 5C:
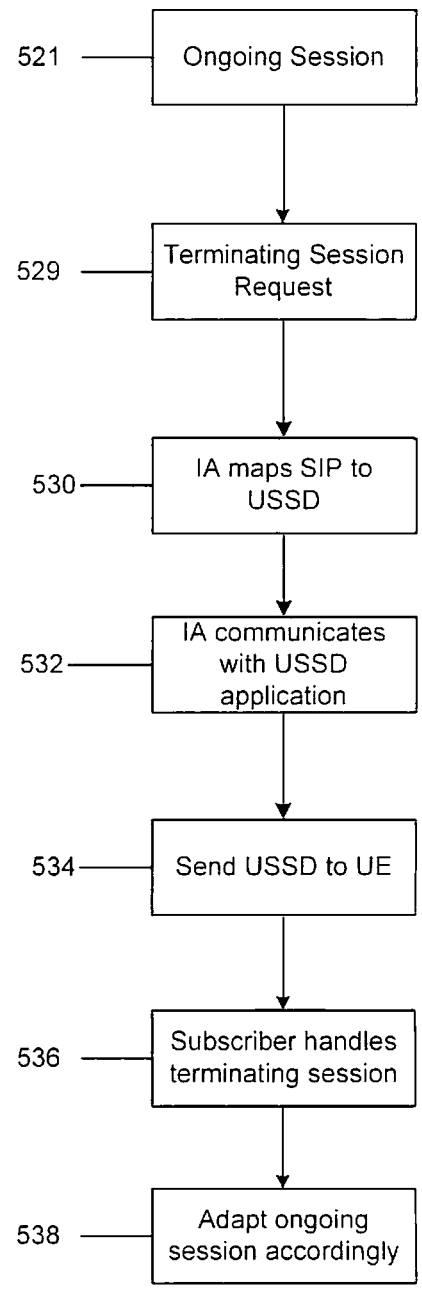

Referring now to FIG. 5c, if a terminating session request is received during the ongoing session 521, a SIP Invite message is received in the IA, which translates the SIP message into an appropriate USSD message and forwards it to the USSD application, e.g. in the serving MSC, 530. The USSD application present in the serving MSC sends a network initiated USSD message to the ICS client in the UE, 534 causing the subscriber to be notified of the incoming session request, 536. The subscriber can then to decide whether accept the incoming session by putting the ongoing session on hold, or whether to reject the incoming session. Alternatively (not shown) the subscriber can also ignore the offered incoming session and after a timeout the incoming session will rejected in the IA.

Figure 5D:
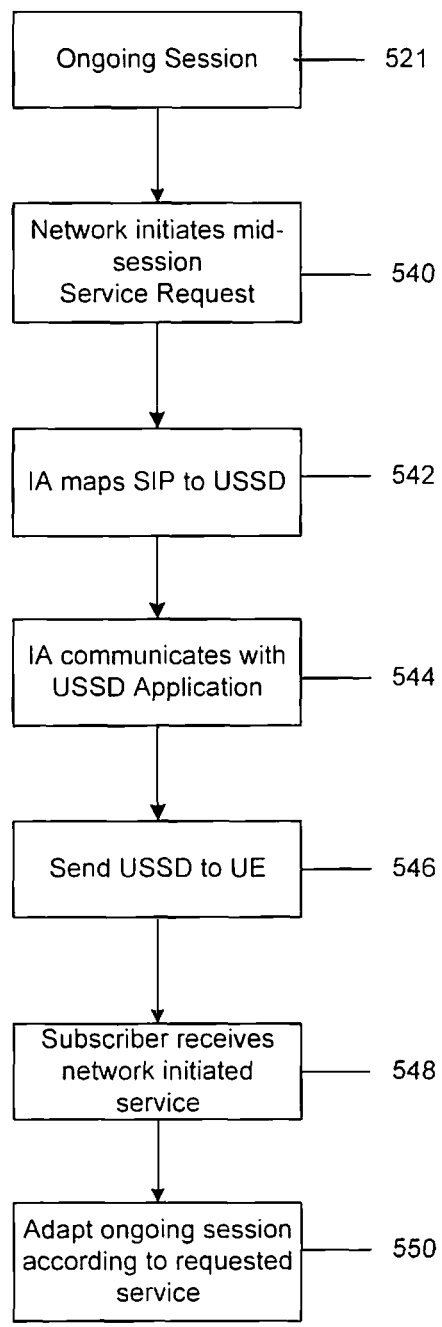

Referring now to FIG. 5d, if the network initiates a mid-session service request, a service request is received during the ongoing session, 521, a SIP message is received in the IA 540. This SIP message is translated by the IA into an appropriate USSD message 542, and the IA forwards it to the USSD application, e.g., in the serving MSC, 544. The USSD application present in the serving MSC sends a network initiated USSD message to the ICS client in the UE, 546 causing the subscriber to be notified of the incoming service request, 548. The session is then adapted according to the needs of the requested service, 550.

Figure 6:
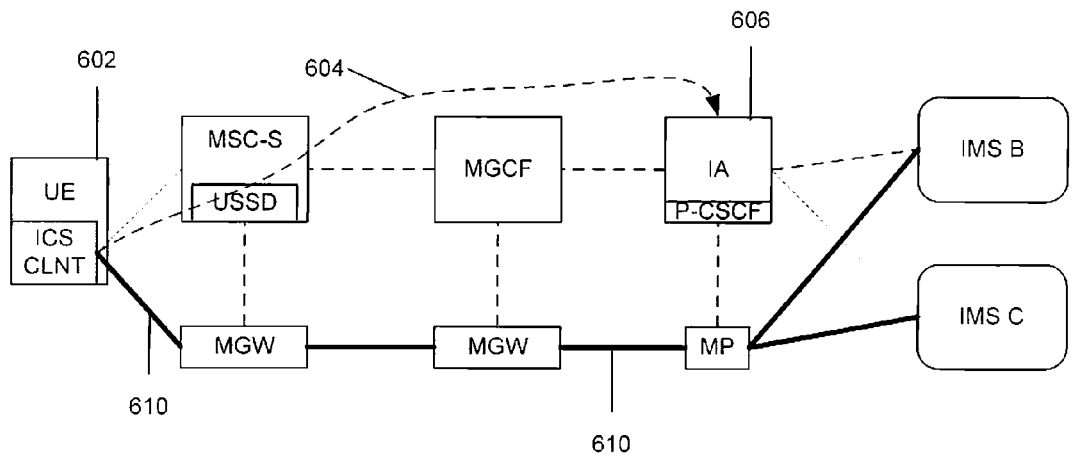
FIG. 6 illustrates a high level block diagram of a USSD controlled Originating Session Setup in parallel to an already ongoing call, according to an embodiment of the present invention.

FIG. 6 illustrates a high level block diagram of a USSD controlled Originating Session Setup in parallel with an ongoing session according to an embodiment of the present invention. When UE 602 attempts to setup a session with IMS C in parallel with ongoing session with IMS B, a USSD message is used to remote control the user plane handling in IA 604. The ICS Protocol over USSD 604 toggles user plane 610 in IA 606 via the ICS Protocol. The Session Setup using the ICS protocol to toggle the user plane assumes that the serving MSC-S has a local USSD application available. However, the USSD application may also located in the HLR without impact on the described mechanisms.

Figure 7:
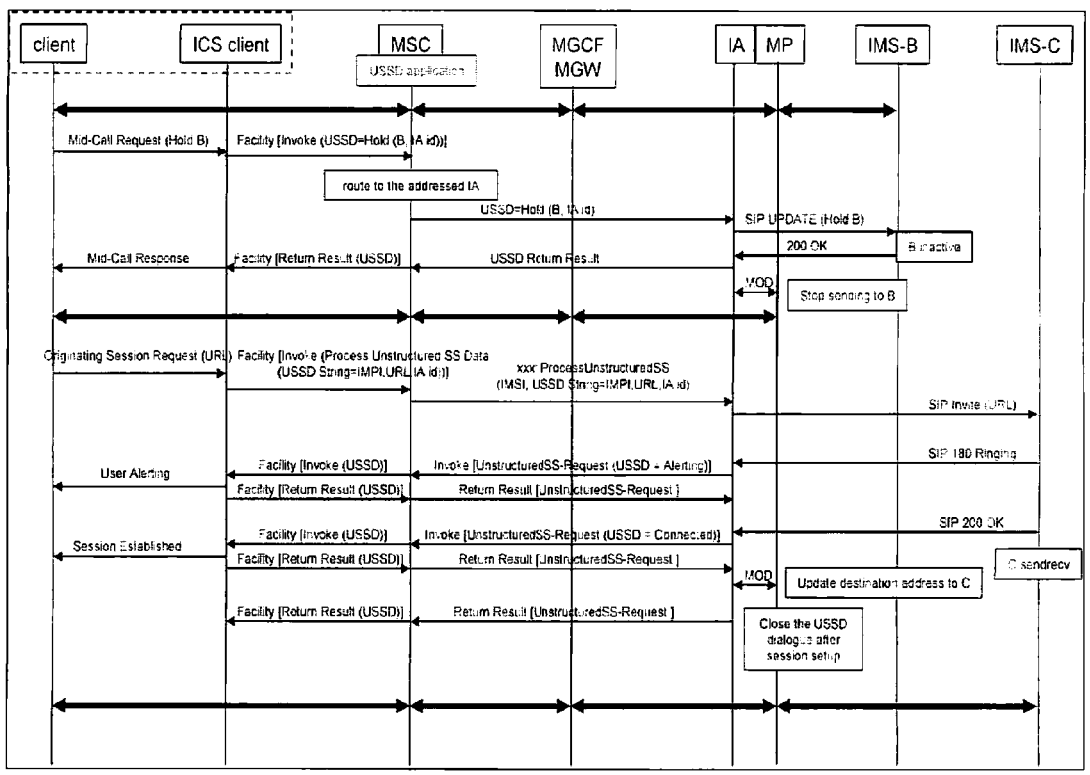
FIG. 7 depicts signaling flow for MSC based USSD application illustrating how a USSD controlled Originating Session Setup in parallel to an already ongoing call, in accordance with an embodiment of the present invention.

FIG. 7 depicts signaling flow for MSC-S based USSD application illustrating a session setup in parallel with an ongoing session in accordance with an embodiment of the present invention. Before setting up the parallel session, the ongoing session is put on hold. A sequence for an HLR based USSD application is identical, except that all USSD messages are forwarded from MSC-S to HLR and the HLR hosts the USSD application for ICS. See FIG. 3 for a simplified block diagram.

The bold double arrows, as in the other signal flow diagrams, indicate a user plane for transporting the payload while the other arrows indicate messages between the involved entities. Generally, both the protocol and the message are indicated. It should be noted that the parameters indicated in the messages are examples and that further parameters may be amended in the messages.

For correlation, IA 306 stores the routing number when sending the USSD message towards the client and checks the received SIP Invite message for this routing number. The routing number indicates the call destination such that the MSC-S routes the call to the MGCF which constitutes an interface between the CS call control, e.g. ISUP, and SIP signaling.

The IA remote controls a Media Proxy, MP, for controlling the user plane. This remote control protocol can e.g. be H.248 based. The MP, on behalf of the IA, mutes the user plane towards IMS B while the subscriber B is on hold. After the parallel session to IMS C it is then possible to toggle between both subscribers. The corresponding user plane control is done by the IA, who orders the related user plane operations from the MP.

Figure 8:
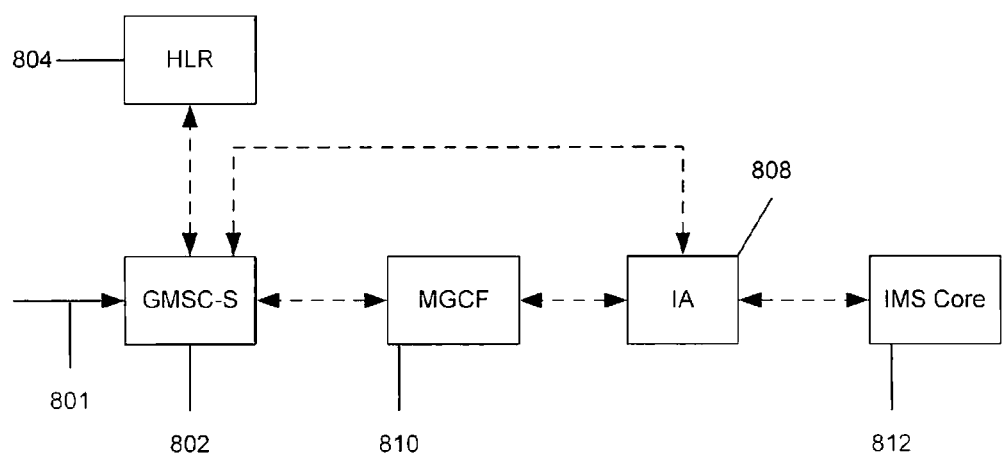
FIG. 8 illustrates architecture for terminating session handling in Gateway MSC, GMSC, forwarding of the call to IMS for service execution.

FIG. 8 illustrates architecture for terminating session handling in Gateway MSC, GMSC. Terminating sessions can be routed via a GMSC if an operator commonly uses MSISDN numbers for subscribers in IMS networks and CS networks. CAMEL mechanisms can be used to route a terminating session to an IMS network for service execution.

There are a number of options for routing the terminating session to the addressed subscriber. Note that as described above the GMSC and HLR have to route the terminating session to the IMS network first for service execution, but there is currently no good way to prevent HLR and GMSC from routing calls from IMS networks to IMS networks again causing, routing loops, i.e., a circular routing problem. So, for the purpose of avoiding circular routing a Domain Selection function can be linked in.

A call setup 801 from any originating subscriber, not shown, enters the GMSC 802, which sends, as normal, the message Send Routing Information, containing B number and requested basic service type, to HLR 804. The corresponding reply, Send Routing Information Result, containing T-CSI and the corresponding gsmSCF address set to the address of the IA, is returned to the GMSC 802. The T-CSI CAMEL service is invoked at the GMSC using A-number, B-number and the requested basic service type. This CAMEL invocation targets the gsmSCF, which however in this case, is the IA node (gsmSCF included in the IA, not shown). The terminating service domain is the IMS network and a routing number is allocated to the UE by the gsmSCF included in the IA. The IA stores the received information. A modified B-number—the routing number—is returned to the GMSC and the GMSC sends the call setup including the routing number to the IA 808 through a MGCF 810. When receiving the setup message, the IA 808 correlates the received routing number with the stored A-number, B-number and the basic service requested and forwards the session setup to the IMS network.

Figure 9:
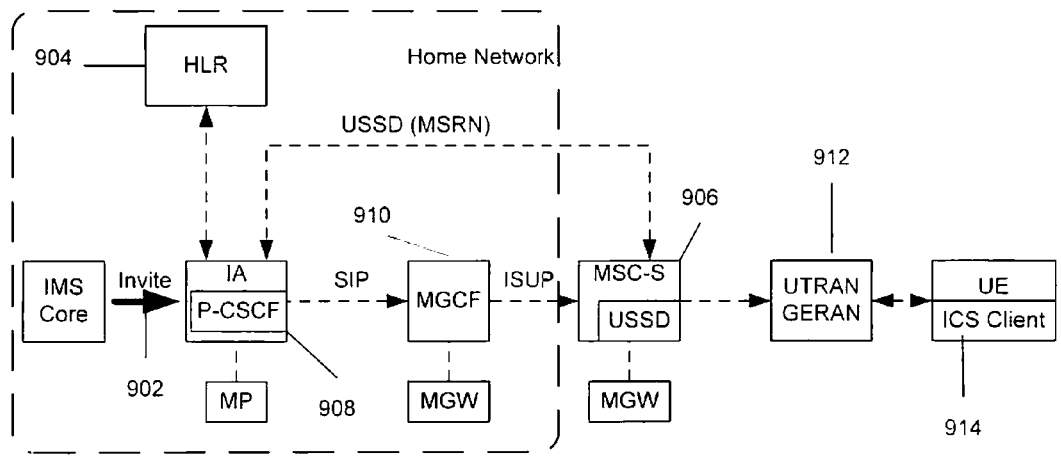
FIG. 9 depicts a USSD controlled terminating Session Handling via CS Access after IMS service execution, in accordance with a preferred embodiment of the present invention.

FIG. 9 depicts a USSD controlled terminating Session Handling via CS Access according to a preferred embodiment of the present invention. This scenario shows how to route the above described terminating session, after terminating service execution in the IMS network. After terminating services are executed in the IMS network, the IMS core sends a SIP Invite message 902 to the IA 908. This is the normal behavior in IMS for terminating sessions, since the IA contains a P-CSCF and the P-CSCF address was stored in the IMS network as contact address of the terminating subscriber. Receiving the SIP Invite, the IA sends a Short Message Service-Send Routing Information, SMS-SRI, MAP operation to the HLR 904. The SMS-SRI is normally not used for terminating calls, but for terminating SMS. It is used here in order to obtain the address of the serving MSC-S from the HLR. So in the return message from HLR the serving MSC-S address is included.

The IA uses this serving MSC-S address for sending a termination session indication, utilizing USSD, to the USSD application in that serving MSC-S 906. MSC-S 906 sends the terminating session indication to UE 914 via a radio access node 912. The ICS client in UE 914 responds with a USSD message which is routed through the serving MSC-S 906 back to the IA 908. If the subscriber, or the UE, based on settings, has accepted the terminating session, the USSD application in MSC 906 allocates a routing number and adds it to the returned USSD message. The session setup, now including the received routing number is passed to MSC-S 906 through MGCF 910. The terminating session is then delivered to the ICS client in the UE. The radio link is kept up until the terminating session arrives at the UE. This avoids paging the UE again for the terminating session.

Figure 10:
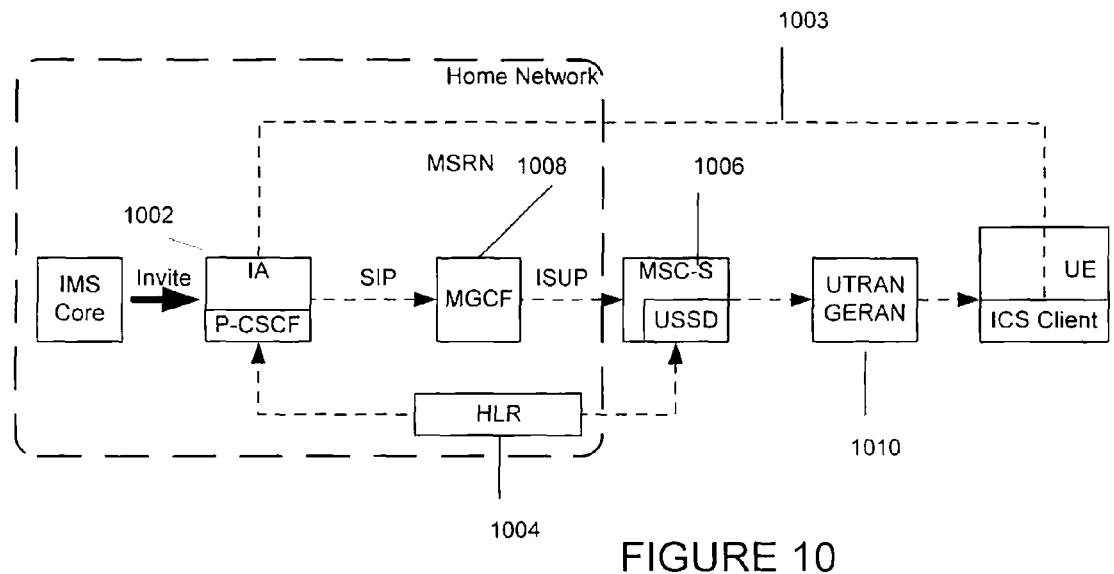
FIG. 10 illustrates an option for using the Send Routing Information, SRI, Mobile Application Part, operation towards the HLR to fetch the MSRN according to an embodiment of the present invention.
Figure 11:
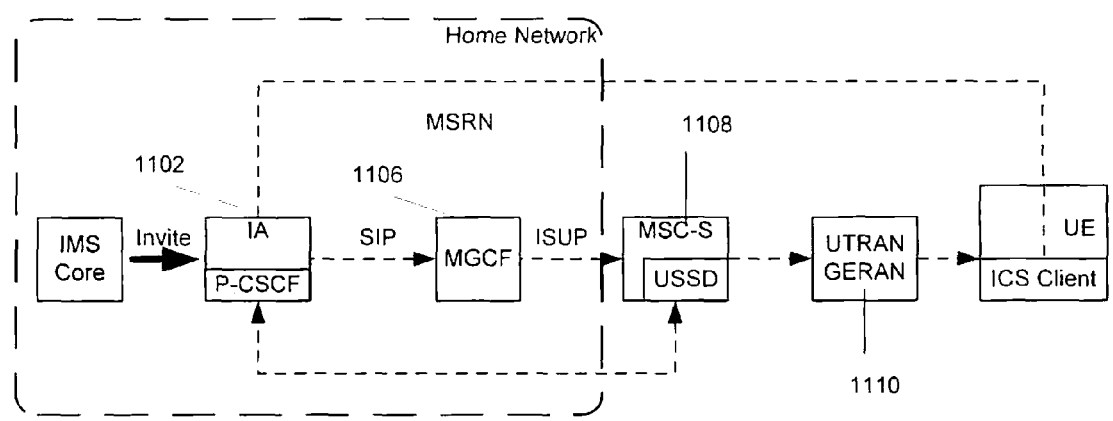
FIG. 11 depicts Terminating Session Handling where the IA uses SRI to HLR for MSRN retrieval according to an embodiment of the present invention.

FIG. 10 illustrates an option for using the normal CS Send Routing Information, SRI, Mobile Application Part, MAP, operation towards the HLR to fetch the routing number according to an embodiment of the present invention. After execution of terminating services in the IMS network, the IMS network sends a SIP Invite request to IA 1002. This is the normal behavior in IMS for terminating sessions, since the IA contains a P-CSCF and the P-CSCF address was stored in the IMS network as contact address of the terminating subscriber. Receiving the SIP Invite, the IA 1002 queries the HLR by using the SRI MAP operation. HLR 1004 then, as normal, retrieves a routing number from the serving MSC-S 1006 and returns the routing number to the requesting IA 1002 in the SRI operation result. The IA then uses the received routing number to deliver the terminating session through a MGCF 1008 to the serving MSC-S 1006. The serving MSC-S 1006 then delivers the session to the UE. Using this standard CS method for delivering the terminating session to the ICS client in the UE has the disadvantage, that it is not possible to deliver additional, IMS network originated data (e.g. SIP URL) to the ICS client. This additional data can be requested through USSD messages directly between IA 1002 and the ICS client in the UE. After receiving the routing number from HLR 1004, the Call Setup is forwarded to the UE client through a MGCF 1008 and the MSC-S 1006. The radio link is kept up until the terminating call arrives at the UE, this avoids paging the UE again for the terminating call FIG. 11 depicts an option for terminating session handling where the IA uses the normal CS Provide Roaming Number, PRN, Mobile Application Part, MAP, operation towards the serving MSC-S for routing number retrieval according to an embodiment of the present invention. The IMS core sends a SIP Invite request to IA 1102. This is the normal behavior in IMS for terminating sessions, since the IA contains a P-CSCF and the P-CSCF address was stored in the IMS network as contact address of the terminating subscriber. The terminating session handling is started in the IA with determining the serving MSC-S address. Here the IA can use the SMS-SRI MAP operation as described previously. Then the IA sends a terminating USSD message to the UE. If the subscriber, or the UE, based on settings, accepts the terminating session, the USSD application in the MSC-S allocates an routing number and adds it to the returned USSD message. The radio link is kept up until the terminating call arrives at the UE.

Figure 12:
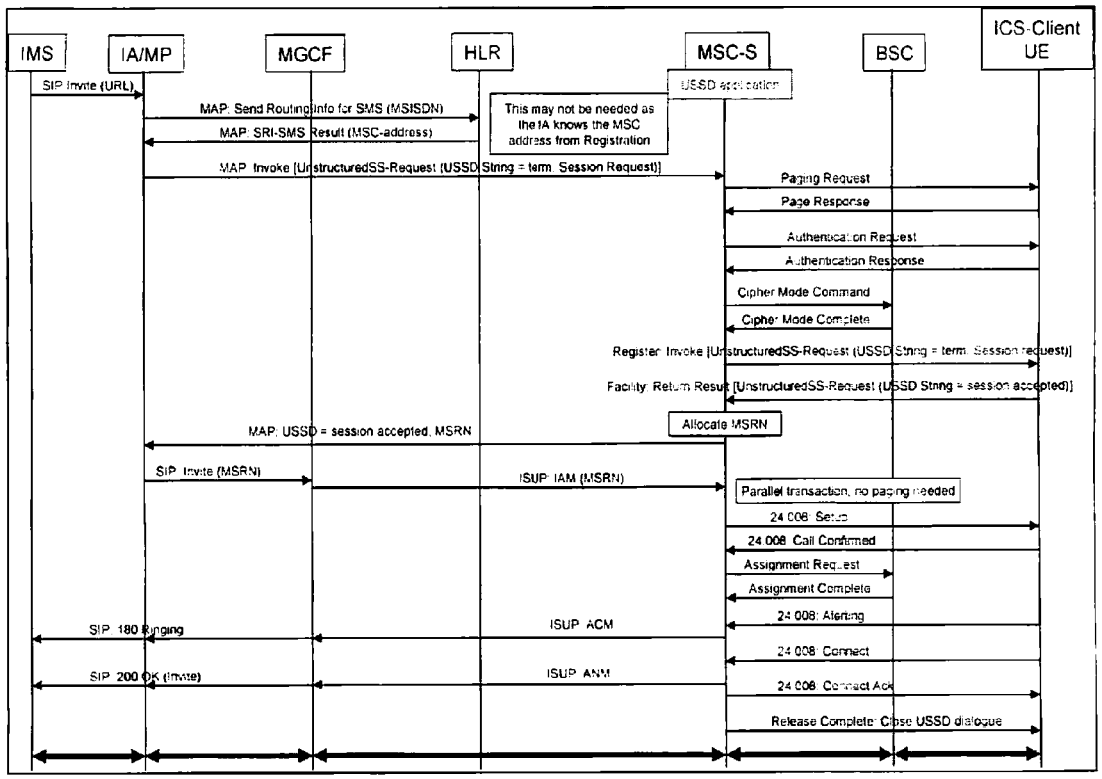
FIG. 12 illustrates a signal flow diagram for using the Short Message Service, SMS-SRI and USSD for fetching of Roaming Number from the IA according to an embodiment of the present invention.

FIG. 12 illustrates a signal flow diagram for using a MAP operation, Send Routing Information for Short Message Service, SRI-SMS, for fetching the serving MSC-S address from HLR. Send Routing Information, SRI, as such is used for calls between GMSC and HLR to retrieve a roaming number. SRI-SMS is the corresponding MAP message for SMS, there the SMS-GMSC asks the HLR for the address of the serving MSC. No roaming number is required for SMS, as SMS is plain signaling. The IA node asks the HLR for the serving MSC-S address by using SRI-SMS towards HLR. Then the HLR can contact the serving MSC-S directly for the terminating call.

The USSD message received via the MSC-S informs the ICS client in the user equipment, UE, that the connection initiated by the following IAM originates in IMS so that the client can handle the call accordingly. It may also include information which is not transmitted in the IAM like the identification, i.e. the URL, of the originating party.

Figure 13:
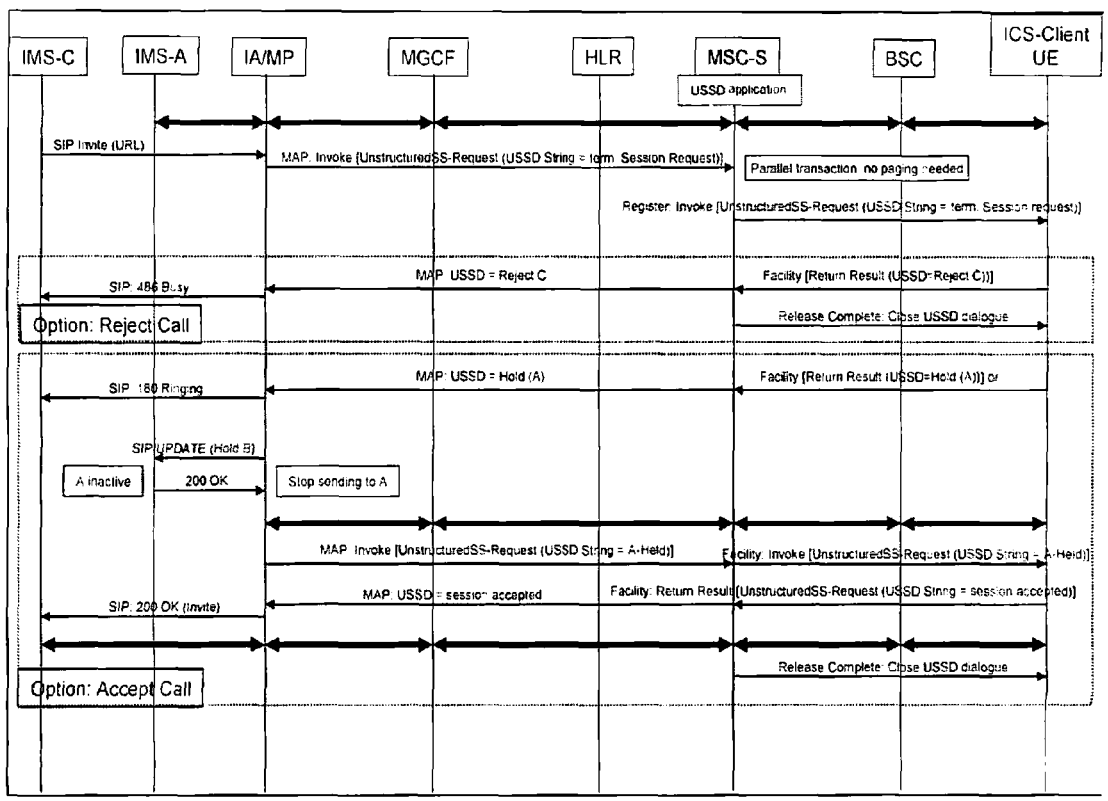
FIG. 13 depicts the case of terminating call while there is an call already ongoing according to an embodiment of the present invention.

FIG. 13 depicts a message flow for the IA establishing a terminating session in parallel to an ongoing session. The signaling sequence shows two different cases, one where the subscriber rejects the offered, parallel session, and another option where the subscriber puts the active call on hold and accepts the offered, parallel session. No routing number allocation is needed for this case since the user plane between UE and IA is already established.

In the call flow one message is returned to the IA which indicates putting IMS-A on hold and to accept the incoming session from IMS-C. Alternatively two messages can be used, one in which the UE instructs the IA to put the call to IMS-A on hold and one in which the incoming session from IMS-C is accepted. Further alternatively both messages could be concatenated in one and the same USSD dialogue, resulting in the a very similar message sequence.

Figure 14:
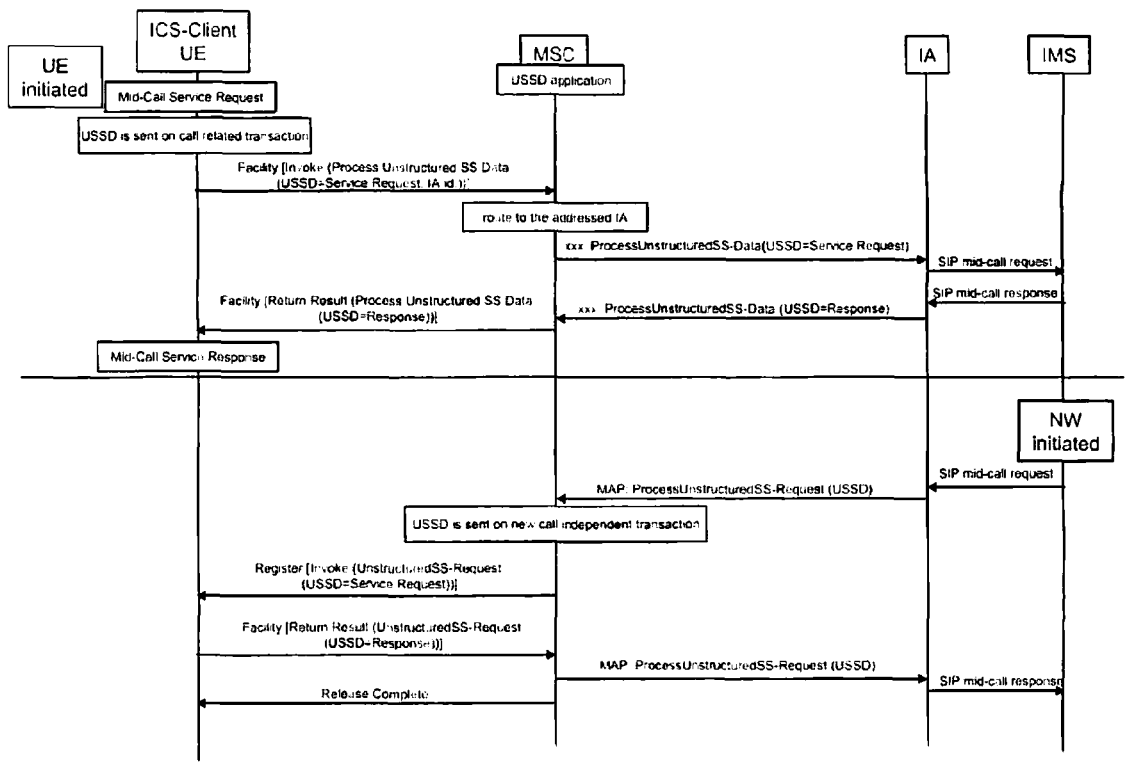
FIG. 14 depicts signal sequences using USSD in mid-call handling. UE initiated and network initiated, utilizing a USSD application in the MSC in accordance with an embodiment of the present invention.

FIG. 14 depicts signal sequences using USSD messages in mid-call handling, a network initiated case and a UE initiated case, utilizing a USSD application in the MSC-S in accordance with an embodiment of the present invention. Note that the USSD application can also be in the HLR, in this case the USSD messages are sent through HLR to the IA. This mechanism is transparent for the USSD application, so it does not have to know the details of the invoked service. The USSD application makes sure that the USSD messages can be exchanged via ICS client and IA. So this can work also for future, currently unknown IMS services.

Although the present invention has been described in detail, those skilled in the art should understand that they can make various changes, substitutions and alterations herein without departing from the spirit and scope of the invention in its broadest form.

What is claimed:

1. A method of control of IP Multimedia Subsystem (IMS) sessions and services, the method comprising:
    a User Equipment (UE) using Unstructured Supplementary Service Data (USSD) via a Circuit Switched (CS) network access so as to associate the UE with an IMS adapter (IA);
    providing an IA identifier to the UE;
    initiating at least one USSD message via a switching node in the CS network for control of a session or service in an IMS network;
    detecting the IA identifier in the at least one USSD message;
    determining an IA instance from the IA identifier;
    routing the at least one USSD message to the IA instance;
    the IA instance allocating a routing number to an IMS Centralized Service (ICS) client in the UE;
    returning the routing number to the ICS client in the UE;
    the ICS client using the routing number for setting up a user plane from the UE to the IA;
    the IMS network sending a Session Initiation Protocol (SIP) Invite message to the IA, which requests a Mobile Station Routing number (MSRN) from the switching node;
    the IA determining the switching node address by using a Short Message Service-Send Routing Information (SMS-SRI) message towards a Home Location Register (HLR);
    the IA sending a terminating session indication via the at least one USSD message to a USSD application in the switching node;
    the switching node sending a terminating USSD message or transaction to the ICS client in the UE; and
    the USSD application in the switching node allocating the MSRN and adding the MSRN to a USSD result received from the ISC client in the UE and returned to the IA.

2. The method of claim 1, wherein associating the UE with the IA comprises access to the IMS network via a Packet Switched (PS) access network utilizing a PS protocol.

3. The method of claim 1, further comprising adding a USSD service code in the at least one USSD message to enable the UE to address a USSD application.

4. The method of claim 1, further comprising the IA using subscriber related data contained in the IA instance for performing IMS registration on behalf of the UE, the subscriber related data including a public user identity including International Mobile Subscriber Identity (IMSI) and Mobile Station ISDN (MSISDN).

5. The method of claim 1, wherein initiating the at least one USSD message is triggered by one or more of:
    availability of the CS network access;
    a subscriber action;
    poor speech quality via a PS access network;
    cell broadcast indicates PS access network not capable of conversational PS access;
    PS access network or PS network overloaded; and
    no PS access network coverage.

6. The method of claim 1, further comprising:
    the ICS client in the UE initiating at least one mid-call service request by sending the at least one USSD message for the at least one mid-call service request on a call related transaction or a call independent transaction to the switching node;
    the switching node routing the at least one mid-call service request to the IA,
    the IA translating the at least one mid-call service request into a corresponding SIP message and routing the SIP message to the IMS network;
    the IMS network sending a SIP response to the IA;
    the IA translating the SIP response into a corresponding USSD reply; and
    sending the USSD reply to the ICS client in the UE.

7. The method of claim 1, further comprising:
    an IMS network initiating at least one mid-call service request by sending at least one SIP mid-call message to the IA;
    the IA translating the at least one SIP mid-call message into at least one USSD message for the at least one mid-call service request, and sending the at least one USSD message to the switching node;
    a USSD application in the switching node sending the at least one USSD message for the at least one mid-call service request to the ICS client in the UE;
    the ICS client in the UE sending a response to the IA; and
    the IA translating the response to a corresponding SIP message and returning the SIP message to the IMS network.

8. The method of claim 1, wherein the switching node comprises one of a Mobile Switching Center (MSC) and a Mobile Switching Center server (MSC-S).

9. A system for control of IP Multimedia Subsystem (IMS) sessions and services, the system comprising:
    a switching node, coupled with a Home Location Register (HLR), at least one equipped with an Unstructured Supplementary Service Data (USSD) handler;
    a User Equipment (UE) using USSD via a Circuit Switched (CS) network access to associate the UE with an IMS adapter (IA), an IMS Centralized Service (ICS) client in the UE providing an IA identifier to the UE;

the UE initiating at least one USSD message via the CS network for control of a session or service in an IMS network;
a detector for detecting the IA identifier in the at least one USSD message;
for determining an IA instance from the IA identifier;
a Mobile Switching Center (MSC) for routing the at least one USSD message to the IA instance;
the IA instance allocating a routing number to the ICS client in the UE;
the IA returning the routing number to the ICS client in the UE;
the ICS client using the routing number to set up a user plane from the UE to the IA;
the IMS network sending a Session Initiation Protocol (SIP) Invite message to the IA, which requests a Mobile Station Routing number (MSRN) from the switching node;
the IA determining the switching node address by using a Short Message Service-Send Routing Information (SMS-SRI) message towards the HLR;
the IA sending a terminating session indication via the at least one USSD message to a USSD application in the switching node;
the switching node sending a terminating USSD message or transaction to the ICS client in the UE; and
the USSD application in the switching node allocating the MSRN and adding the MSRN to a USSD result received from the ISC client in the UE and returned to the IA.

10. The system of claim 9, wherein the IA further comprises means for accessing the IMS network via a Packet Switched (PS) access network utilizing a PS protocol.

11. The system of claim 9, further comprising the UE adding a USSD service code in the at least one USSD message to enable the UE to address a USSD application.

12. The system of claim 9, further comprising the IA using subscriber related data contained in the IA instance for performing IMS registration on behalf of the UE, the subscriber related data including a public user identity including International Mobile Subscriber Identity (IMSI) and Mobile Station ISDN (MSISDN).

13. The system of claim 9, wherein the UE, initiating the at least one USSD message, is triggered by one or more of:
availability of the CS network access;
a subscriber action;
poor speech quality via a PS access network;
cell broadcast indicates PS access network not capable of conversational PS access;
PS access network or PS network overloaded; and
no PS access network coverage.

14. The system of claim 9, further comprising:
the ICS client in the UE initiating at least one mid-call service request by sending the at least one USSD message for the at least one mid-call service request on a call related transaction or a call independent transaction to the switching node;
the switching node including means for routing the mid-call service request to the IA;
the IA translating the at least one mid-call service request into a corresponding SIP message and routing the SIP message to the IMS network;
the IMS network sending a SIP response to the IA;
the IA translating the SIP response into a corresponding USSD reply; and
the IA sending the USSD reply to the ICS client in the UE.

15. The system of claim 9, further comprising:
means in the IMS network for initiating at least one mid-call service request by sending at least one SIP mid-call message to the IA;
the IA translating the at least one SIP mid-call message into at least one USSD message for the at least one mid-call service request, and sending the at least one USSD message to the switching node;
a USSD application in the switching node causing the at least one USSD message for the at least one mid-call service request to be sent to the ICS client in the UE;
the ICS client in the UE sending a response to the IA; and
the IA translating the response to a corresponding SIP message and returning the SIP message to the IMS network.

16. The system of claim 9, wherein the switching node comprises one of a Mobile Switching Center (MSC) and a Mobile Switching Center server (MSC-S).

* * * * *

UNITED STATES PATENT AND TRADEMARK OFFICE
CERTIFICATE OF CORRECTION

PATENT NO. : 8,743,868 B2
APPLICATION NO. : 11/935455
DATED : June 3, 2014
INVENTOR(S) : Witzel et al.

It is certified that error appears in the above-identified patent and that said Letters Patent is hereby corrected as shown below:

On the Title Page, in Item [56], under "OTHER PUBLICATIONS", in Column 2, Line 1, delete "Profect;" and insert -- Project; --, therefor.

In the Specification

Column 6, Line 10, delete "UE 212" and insert -- UE 201 --, therefor.

Column 8, Line 36, delete "IA 604." and insert -- IA 606. --, therefor.

Column 8, Line 58, delete "IA 306" and insert -- IA 310 --, therefor.

Column 9, Line 67, delete "MSC 906" and insert -- MSC-S 906 --, therefor.

In the Claims

Column 12, Line 3, Claim 1, delete "ISC" and insert -- ICS --, therefor.

Column 13, Line 29, Claim 9, delete "ISC" and insert -- ICS --, therefor.

Signed and Sealed this
Thirtieth Day of September, 2014

Michelle K. Lee
*Deputy Director of the United States Patent and Trademark Office*